7/4/86 OR H 000,031

United States Statutory Invention Registration [19]

[11] Reg. Number: H31

Wagner et al. [45] Published: Mar. 4, 1986

[54] METHOD AND APPARATUS FOR DETERMINING THE SIZE DISTRIBUTION OF TOBACCO

[76] Inventors: John R. Wagner, 5102 Field-Horney Rd., Greensboro, N.C. 27406; Werner P. Kirschstein, 325 E. Montrose Dr., Greensboro, N.C. 27407; Floyd S. Cowan, Rte. 1, Box 314A, Sutherland, Va. 24594

[21] Appl. No.: 456,737

[22] Filed: Jan. 10, 1983

[51] Int. Cl.[4] ..... B07B 1/00

[52] U.S. Cl. ..... 209/237; 209/289; 131/312

[58] Field of Search ..... 209/133, 237, 239, 289; 131/290, 305, 312

[56] References Cited

U.S. PATENT DOCUMENTS

| | | | |
|---|---|---|---|
| 1,771,996 | 8/1930 | Chapman | 209/289 |
| 2,274,891 | 3/1942 | Dysthe | 209/289 |
| 2,782,926 | 2/1957 | Saxe | 209/237 |
| 3,401,701 | 9/1968 | Pietrucci | 209/133 |
| 3,545,281 | 12/1968 | Johnston | 209/237 |
| 4,233,996 | 11/1980 | Brackmann et al. | 131/312 X |

*Primary Examiner*—Edward A. Miller

[57] ABSTRACT

Tobacco is graded by size by separating a sample into size fractions using a rotary drum screen. The sample is characterized by two distribution curves, one for a finer portion and the other for a coarser portion. The crossing point of logarithmic plots of the percentage by weight vs. particle size distributions of the two portions provides a precise and sensitive descriptor, which can be termed as a "percent desirable fraction," for grading the size characteristics of threshed or cut tobacco.

11 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR DETERMINING THE SIZE DISTRIBUTION OF TOBACCO

FIELD OF THE INVENTION

The present invention relates to the processing of tobacco and, in particular, to a method and apparatus for determining the particle size distribution of tobacco.

BACKGROUND OF THE INVENTION

To facilitate the handling, storage and further processing of tobacco, the leaves are threshed by forcing them through "baskets", plates having suitable openings defined by a grid that shreds the leaves so that the pieces can pass through the openings. Threshing reduces the intact leaves to particles, so the leaf fraction may be separated from the sand, stems and other foreign material.

Many variables affect the threshold operation. Among them are the grade of the tobacco, the temperature, the moisture content, the size of the baskets and the rotor speed of the thresher. Variables affecting separation include the velocity of the air, the balance and distribution of the air flow, the ratio of stem to lammina and the number of separation stages.

In practice, threshing is presently carried out commercially under operating conditions that have been determined empirically. There is no scientific way of optimizing the variables of the threshing and separation process to produce an optimum result, namely, a size distribution in the threshed product that yields the largest amount of usable tobacco and minimizes the waste in the form of pieces too small to be processed further for direct use in tobacco products. Tobacco is very costly, and important economic advantages are available from an optimum threshing process.

One of the factors that has hindered the development of an optimum threshing process on a scientific and quantitative basis, particularly the ability to alter the process variables in accordance with the material variables in a manner that yields the best results, has been the lack up to now of any method and apparatus for determining the precise particles size distribution of threshed tobacco. It has, therefore, been impossible to enhance the threshing and separation process, because the process can never be more precise than are the measurements of the results of the process.

It is also desirable to make accurate determinations of the size distributions of cut tobacco for essentially the same reasons as in the case of threshed tobacco, namely, to aid in perfecting the control of the cutting operation for optimum production of usable tobacco in the end product.

SUMMARY OF THE INVENTION

There are provided, in accordance with the present invention, a process for determining the particle size distribution of threshed or cut tobacco and apparatus for carrying out the process. More particularly, the apparatus comprises an open cylindrical drum, the cylindrical wall of which is defined by a series of longitudinally spaced-apart screens. Each screen has openings of uniform size and shape, and the openings of each successive screen are larger than the openings of the next preceding screen moving from one end of the drum towards the other. The drum is mounted to rotate about an axis, which axis is coincident with the axis of the drum, that slopes downwardly from the end having the smaller screen openings. A suitable drive rotates the drum, and as it rotates, a sample of tobacco is fed at a suitable rate into the upper end of the drum and is separated into fractions according to size by falling to the bottom of the drum and out through the screen openings. Each fraction is separately collected by a collector trough.

The screens are sized to form a series according to a regular progression. For threshed tobacco, for example, the size of the openings of each screen that has openings larger than a selected screen of the series is 50% larger than the size of the openings of the next smaller screen, and the size of the openings of each screen that has openings smaller than the selected screen is 50% smaller than the size of the openings of the next larger screen. With a selected screen having 1.0 in. openings, the openings of larger screens in the series increase 50% in size seriatim, and the openings of the smaller screens decrease 50% in size seriatim. The series for this example is (in inches): 0.063, 0.125, 0.250, 0.500, 1.000, 1.500, 2.250, 3.375, 5.000, etc. An alternative series for threshed tobacco is every other size in a square root of two series based on 1.0 in. A suitable series for cut tobacco is an ISO standard square root of two series consisting of 12 screens having openings ranging from 22.6 mm to 0.5 mm, the total open areas being proportioned logarithmically as discussed below.

It is necessary that the total open areas of the several screens increase as some function of the increase of the screen opening size, because it becomes progressively easier to separate the larger sized fractions. For example, the ratio of the total open area $A_s$ of each screen to the total open area $A_t$ of all of the screens may be proportionate by a selected constant C to the logarithm of the inverse of the opening size X - viz., $A_s/A_t = C \ln(1/X)$. If $A_t$ is selected to be 1.0, then the sum of $A_{s1}, A_{s2}, \ldots, A_{sn} = 1.0 = C\,[\ln(1/X_1) + \ln(1/X_2) + \ldots + \ln(1/X_m)]$. The screen opening sizes X are known, and C becomes a scale factor which can be worked back through the series to produce the individual open areas. ("Open area" means total screen area minus total wire area.)

The method, according to the invention, employs the above-described drum to obtain fractions of a threshed or cut tobacco sample separated by sizes. Each fraction is weighed and the percentage by weight of the total sample calculated for each fraction. By virtue of the fact that weight is used to represent size, the effect of density comes into play. For threshed leaf tobacco, a plot of the screen size versus weight fraction does not yield a straight line.

The observation stated in the preceding sentence is of importance in understanding the present invention and calls for further explanation. It has been discovered in the course of the research of the present inventors leading to the present invention that threshed tobacco exhibits multiple distributions, in practice, one distribution for a finer portion and another for a coarser portion—no sample has exhibited a single normal distribution. Having determined this, one can see now that the main reason for two distributions is the difference in density between the larger pieces, which include relatively greater amounts of denser tobacco leaf elements such as veins, and the smaller pieces, which are less likely to contain the denser elements. A third fraction is possible, containing larger portions of stems. However, if they are present, they are not resolved by the range of screens employed. When the distributions are plotted on a log-probability scale, two straight lines of different slopes are obtained, one representing the distribution of the less dense (finer) portion of the sample and the other the distribution of the more dense (coarser) portion. Hence, a suitable characterization of the sample is the percentage weight of the sample that is a size larger than the size particles at the point where the two distribution lines intersect. Experimentation suggests that this characterization is precise to one percent or better under optimum test conditions (good quality tobacco, uniform moisture content, etc.).

For a better understanding of the invention, reference may be made to the following descriptions of an embodiment of the apparatus and an example of the method, taken in conjunction with the figures of the accmpanying drawings.

DESCRIPTION OF THE EMBODIMENT

Figure 1:
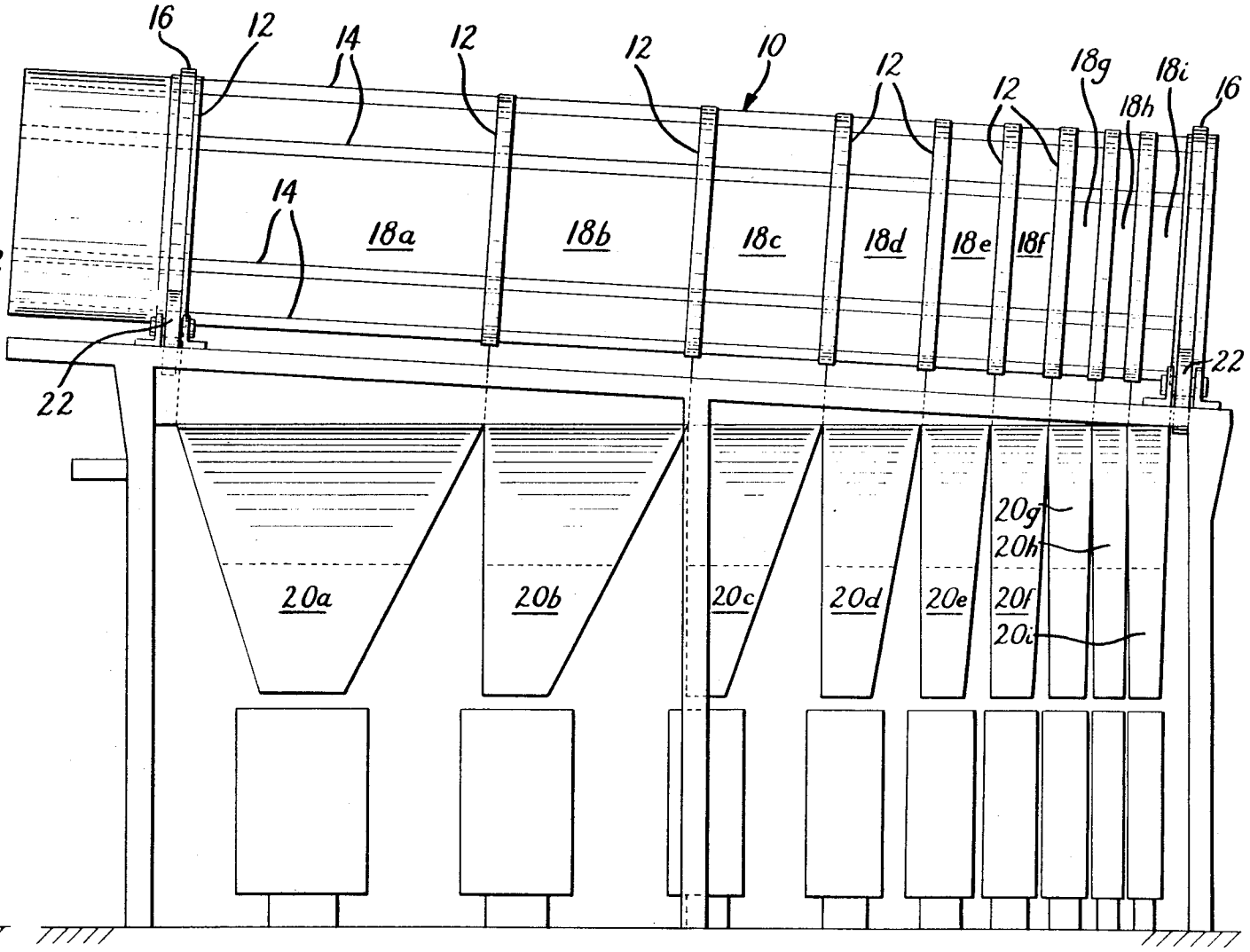
FIG. 1 is a side elevational view of the apparatus.
Figure 2:
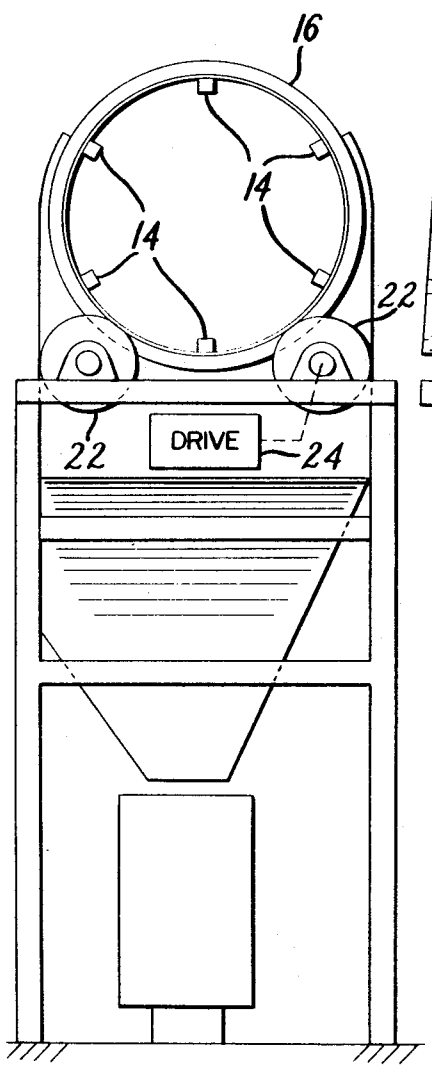
FIG. 2 is an end view of the apparatus.

The drum 10 comprises a structural framework composed of circumferential bands or hoops 12 spaced apart lengthwise by suitable distances (as described below) to accommodate the screens between them and internal lengthwise flights 14 welded to the bands at each crossing point. The flights are equally spaced apart circumferentially and extend the full length of the drum. Trunnion rings 16 are welded to the framework at two places to maintain roundness of the framework and provide the rolling surface for the cylinder. The framework is, preferably, constructed of stainless steel for corrosion resistance and strength. Screens 18*a*, 18*b*, etc. are fastened, such as by nuts and bolts or screws, to the outside of the framework. The bands 12 separate each screen from the next and allow short blank areas between screens for separation of the collection of the fraction of the sample passing through each screen. A hopper/-chute 20*a*, 20*b*, etc. is used to collect the corresponding fraction that passes through the associated screen.

The drum 10 is supported by rollers 22, at least one of which is driven by a suitable drive 24 to rotate the drum. The rotary axis of the drum coincides, of course, with the drum axis and slopes down from the end with the smallest screen size. As the drum rotates, the sample is continuously circulated up with the rising flights, from which it falls to the bottom. The slope provides for slow movement of the sample toward the lower end. The elevation of one set of supporting rollers 22 can, if desired, be made adjustable to vary the throughput rate.

The preferred characteristics of the sizes of the screen openings and open areas of the screens are described above. The following example illustrates a practical application of those characteristics.

Drum diameter—3.0 feet

Drum length (overall)—15.0 feet, 4 in.

Widths of bands 12—2.0 in.

Screens:

TABLE 1

| Ref. No. | Opening Size (in.) | Open area - % of total | Length of screen (in.) |
|---|---|---|---|
| 18a | 0.063 | 29.4 | 46.3 |

TABLE 1-continued

| Ref. No. | Opening Size (in.) | Open area - % of total | Length of screen (in.) |
|---|---|---|---|
| 18b | 0.125 | 20.6 | 29.3 |
| 18c | 0.250 | 15.4 | 19.5 |
| 18d | 0.500 | 11.7 | 14.1 |
| 18e | 1.000 | 8.9 | 10.0 |
| 18f | 1.500 | 6.5 | 7.2 |
| 18g | 2.250 | 4.6 | 4.9 |
| 18h | 3.375 | 2.9 | 3.4 |
| 18i | 5.000 | * | * |

*not included in calculations of open areas.

The apparatus is well suited to automation. Each collecting pan can be supported by a load cell, and the weight data from the load cells can be supplied directly to a computer that calculates and outputs tabular or graphic form data.

EXAMPLE OF THE PROCESS

Twenty pounds of threshed leaf-grade tobacco were charged into a feeder set to deliver two and one-half pounds of tobacco per minute to the rotary drum. The cylinder, pitches at 4° and rotating at 14 RPM, separated the sample into nine fractions, the individual weights of which are shown in the second column of Table 2. The percent falling into each fraction was calculated and totaled to give the cumulative weight at each fraction.

TABLE 2

| Size, mm | Weight, lbs. | Fractional % | Cumulative % |
|---|---|---|---|
| 127 | 0.34 | 1.7 | 1.7 |
| 86 | 1.24 | 6.2 | 7.9 |
| 57 | 3.24 | 16.2 | 24.1 |
| 38 | 4.98 | 24.9 | 49.0 |
| 25.4 | 5.50 | 27.5 | 76.5 |
| 12.7 | 2.70 | 13.5 | 90.0 |
| 6.4 | 1.04 | 5.2 | 95.2 |
| 3.2 | 0.62 | 3.1 | 98.3 |
| 1.6 | 0.34 | 1.7 | 100.0 |

Figure 3:
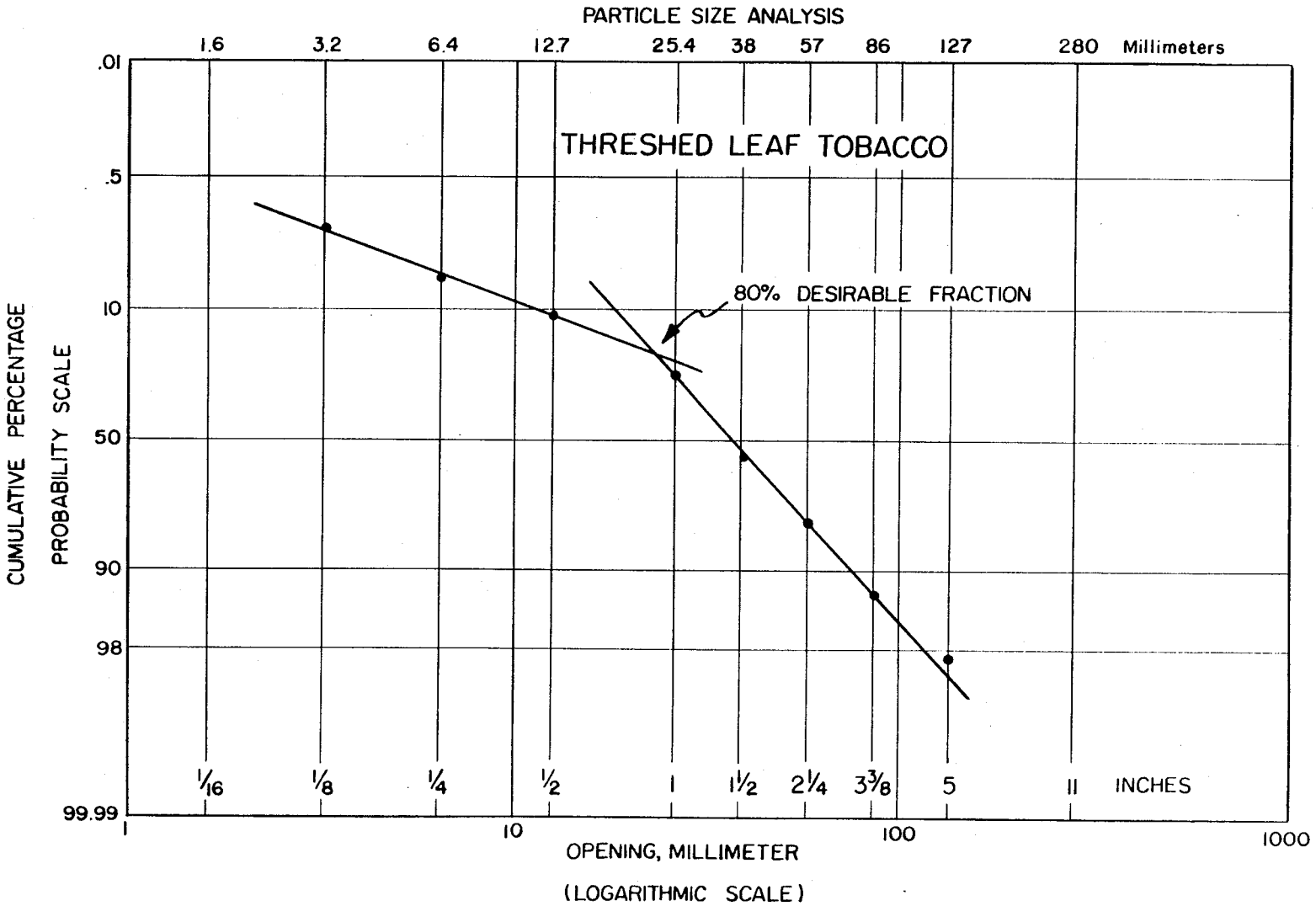
FIG. 3 is a graph on a logarithmic scale of the weight fractions of a typical sample of threshed tobacco obtained using the invention.

FIG. 3 is a graph on logarithmic-probability paper of the data from the above example. The graph clearly shows the two distributions—fine and coarse—of the sample. This sample may be characterized as having an 80% "desirable fraction." This single parameter, which is based on the point where the two distribution lines on the graph cross, is deemed to be a descriptor of the sample that is sufficiently precise and sensitive to be of considerable value in grading tobacco and in enabling enhancement of the threshing process by scientific and quantitative techniques. The point of intersection is the point at which approximately one-half of the weight at that size fraction includes veins and one-half does not. This point represents a reasonable separation between the desirable fraction of larger particles and the poor tobacco fines. Tests show that the ¼" fraction contains no desirable tobacco, the ½" fraction contains 72% desirable tobacco, and the 1" and 1.5" fractions contains 90% to 95% desirable tobacco.

I claim:

1. A method of determining the size distribution of tobacco comprising the steps of introducing a sample of tobacco into the upper end of a rotating inclined cylindrical drum, the cylindrical wall of which has a series of longitudinally separated screens, each screen of the series having uniform-sized and shaped openings and the sizes of the openings of the screens increasing substantially regularly from the upper end to the lower end of the drum, separately collecting the fraction of the tobacco pieces that fall through each screen of the drum, weighing each such fraction, calculating the percentage by weight of each fraction, and characterizing the tobacco by the respective slopes of logarithmic plots of the percent by weight of a finer portion and a coarser portion.

2. A process according to claim 1, wherein the size distributions are characterized by a term representing the percentage by weight of that portion of the sample that is larger than the size represented by the intersection between the logarithmic plots of the finer and coarser portions.

3. A process according to claim 1, wherein the size of the openings of each screen that is larger than a selected screen of the series is about 50% larger than the size of the openings in the next smaller screen and wherein the size of the openings of each screen that is smaller than the selected screen is about 50% smaller than the next larger screen.

4. A process according to claim 1, wherein the total open area $A_s$ of each screen of the series is substantially proportionate by a constant C to the total open area $A_t$ of all of the screens times the log of the inverse of the size X of the openings—viz., $A_s = A_t (C \cdot \ln (1/X))$.

5. A process according to claim 3, wherein the total open area $A_s$ of each screen of the series is substantially proportionate by a constant C to the total open area $A_t$ of all of the screens times the log of the inverse of the size X of the openings—viz., $A_s = A_t(C \cdot \ln(1/X))$.

6. Apparatus for determining the size distribution of tobacco pieces comprising an open circular cylindrical drum, the cylindrical wall of which is defined by a series of longitudinally spaced-apart screens, each of which has openings of uniform size and shape, and the openings of each successive screen being larger than the openings of the next preceding screen moving from one end of the drum to the other, means mounting the drum for rotation about an axis that slopes downwardly from said one end to the other end and is coincident with the longitudinal axis of the drum, a multiplicity of longitudinally extending equally circumferentially spaced-apart flights affixed to the inside of the drum and adapted to lift successive masses of the pieces upon rotation of the drum, whereupon they fall back to the lower portion of the drum upon further rotation thereof, means for rotating the drum about said axis, and means for separately collecting that fraction of a sample of tobacco fed into the upper end of the drum that falls through the openings of each screen.

7. Apparatus according to claim 6, wherein the size of the openings of each screen that are larger than the openings of a selected screen of the series is about 50% larger than the size of the openings of the next smaller screen and wherein the size of the openings of each screen that are smaller than the selected screen is about 50% smaller than the next larger screen.

8. Apparatus according to claim 6 wherein the total open area $A_s$ of each screen of the series is substantially proportionate by a constant C to the total open area $A_t$ of all the screens times the log of the inverse of the size X of the openings—viz., $A_s = A_t (C \cdot \ln(1/X))$.

9. Apparatus according to claim 7 wherein the sizes of the screen openings ranges from 0.063 inch to 5.00 inch and wherein the selected screen has 1.00 inch openings.

10. Apparatus according to claim 7 wherein the total open area $A_s$ of each screen of the series is substantially proportionate by a constant C to the total open area $A_t$ of all the screens times the log of the inverse of the size X of the openings—viz., $A_s = A_t ((C \cdot \ln(1/X))$.

11. Apparatus according to claim 10 wherein the sizes of the screen openings range from 0.063 inch to 5.00 inch and wherein the selected screen has 1.00 inch openings.

* * * * *